United States Patent [19]
Allott et al.

[11] Patent Number: 5,702,660
[45] Date of Patent: Dec. 30, 1997

[54] PROCESS FOR IN SITU MOLDING OF A BEARING MATERIAL IN A BALL AND SOCKET JOINT ASSEMBLY

[75] Inventors: Mark T. Allott, Chillicothe; James J. Billimack, Metamora; Timothy C. Moritz, Peoria, all of Ill.

[73] Assignee: Caterpillar Inc., Peoria, Ill.

[21] Appl. No.: 622,543

[22] Filed: Mar. 25, 1996

[51] Int. Cl.⁶ ............................................................ B29C 45/14
[52] U.S. Cl. ............................................................ 264/242
[58] Field of Search ...................................... 264/242, 317; 403/135, 140, 122, 132, 133

[56] References Cited

U.S. PATENT DOCUMENTS 3,218,376  11/1965  Schindler et al. ........................ 264/317
3,629,921  12/1971  Davies et al. ............................ 29/149.5
3,734,660   5/1973  Davies et al. ............................ 425/123
4,290,181   9/1981  Jackson ................................... 29/458

*Primary Examiner*—Jan H. Silbaugh
*Assistant Examiner*—Edmund H. Lee
*Attorney, Agent, or Firm*—Pankaj M. Khosla

[57] ABSTRACT

A process is provided for injection molding a plastic material into an interfacial space between a spherical ball and a spherical cavity of a ball and socket joint assembly to form a plastic bearing which has an as-molded tapered undercut. A sacrificial ring having a preselected outer diameter and a generally triangular cross-sectional shape is selected. The sacrificial ring is placed around the ball adjacent the neck of the ball assembly. The sacrificial ring is rigidly confined between the ball, the cavity, and the mold. The plastic material is injection molded into the interfacial space and a plastic bearing having a tapered undercut which mimics the shape of the sacrificial ring is formed.

11 Claims, 5 Drawing Sheets

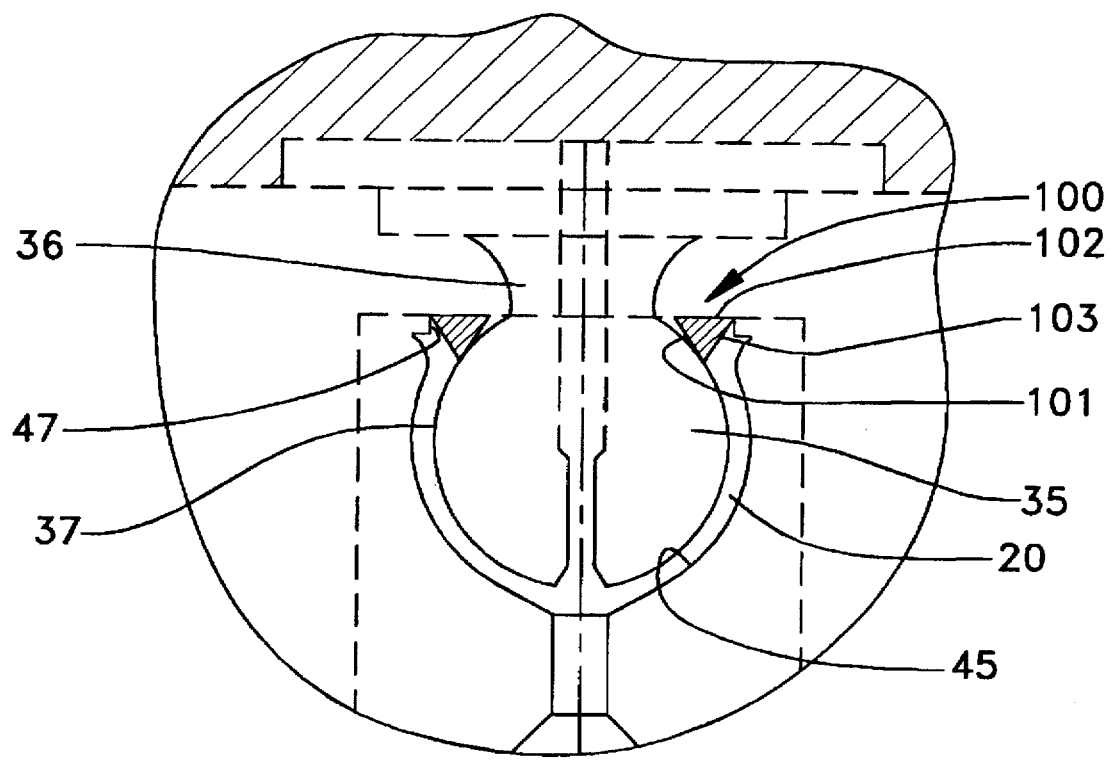
Fig_1a_

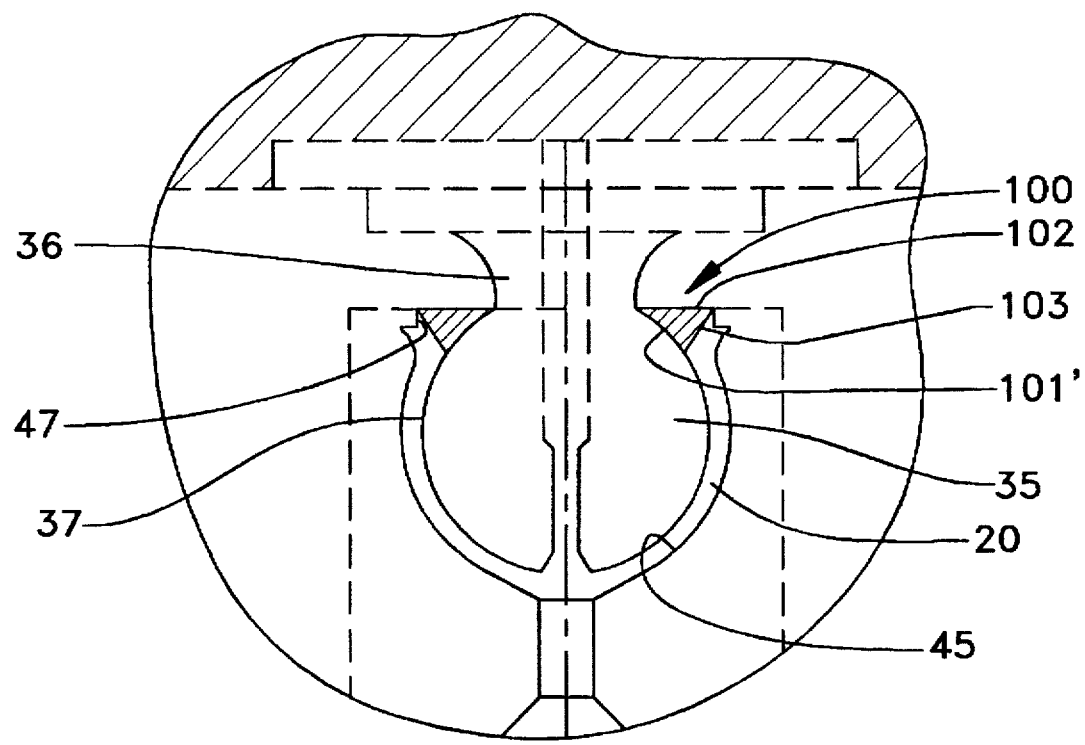
Fig_1b_

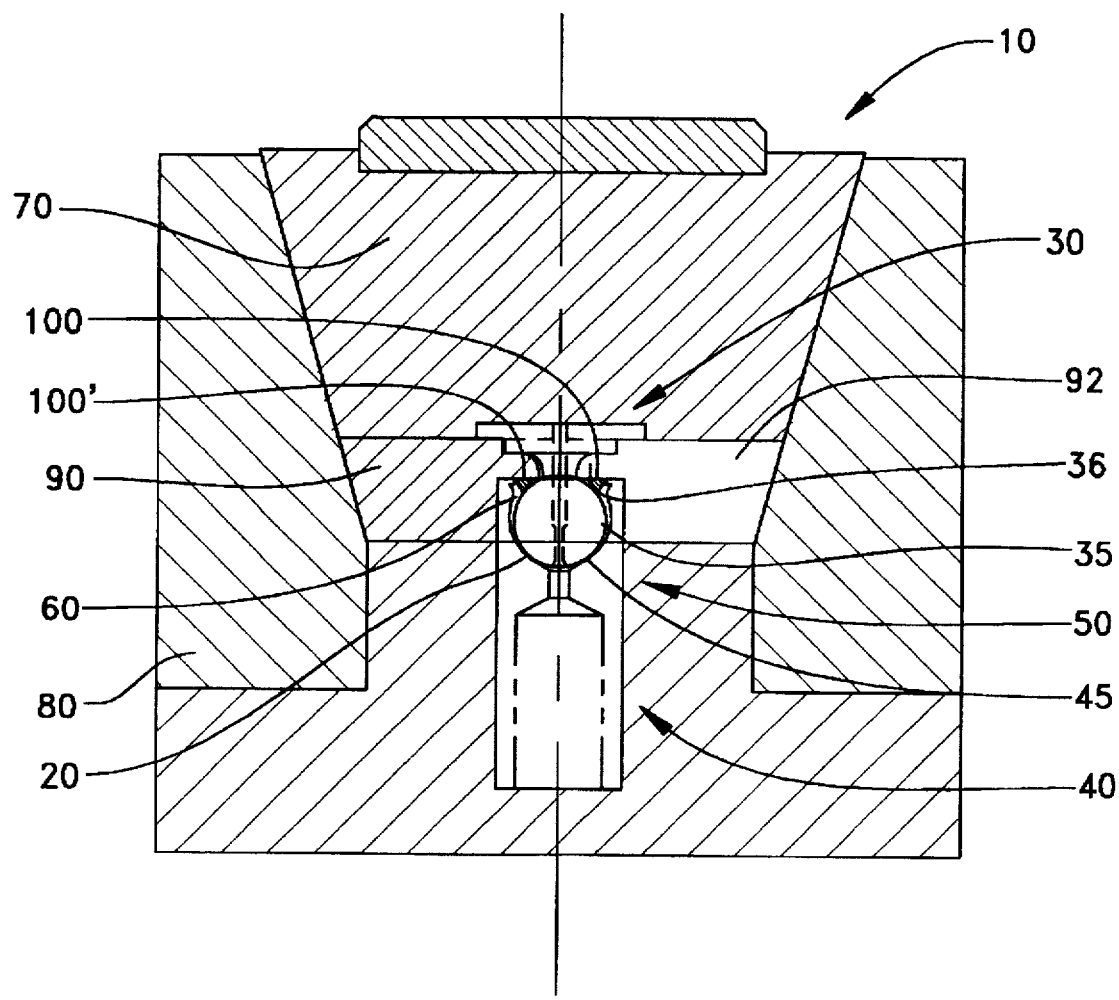

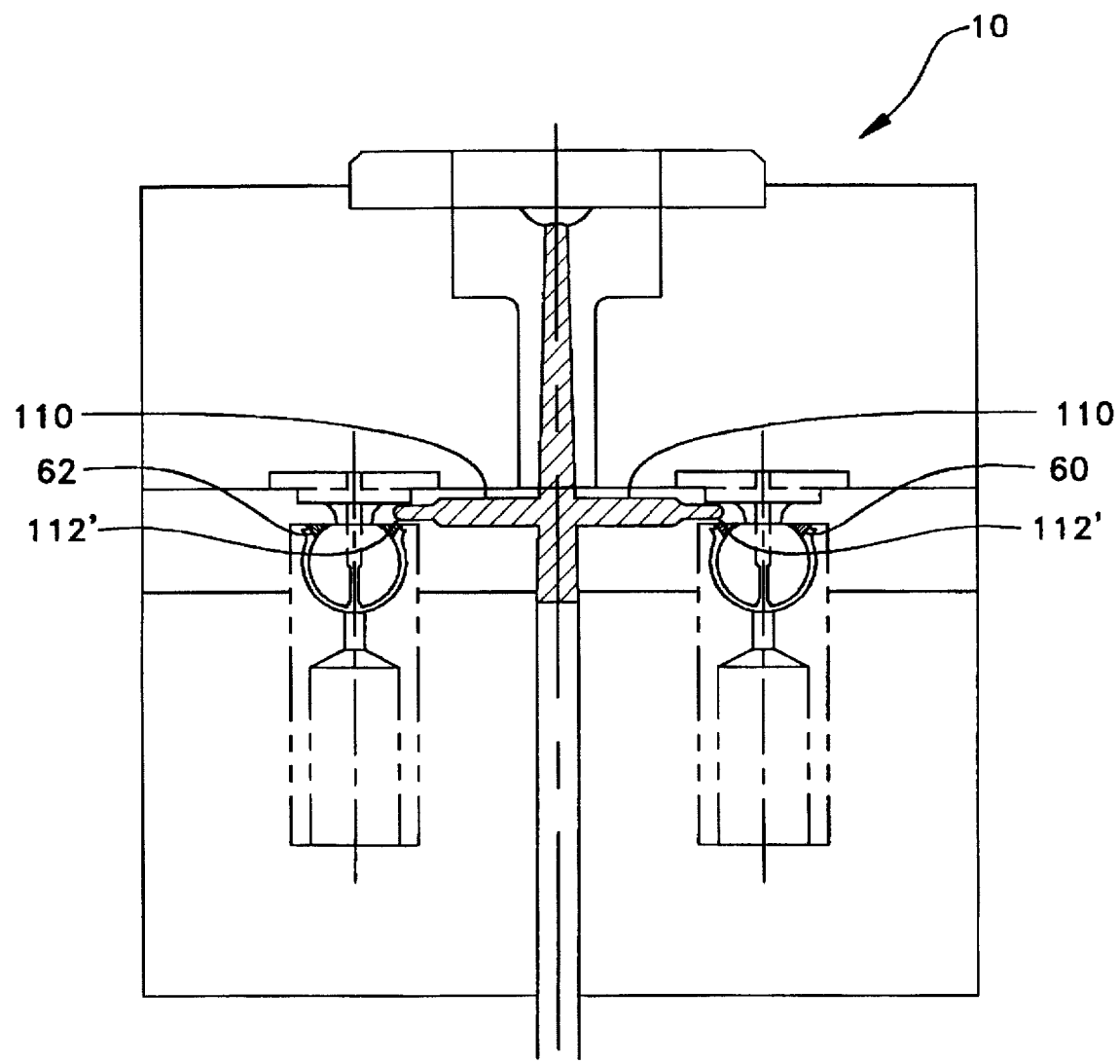

PROCESS FOR IN SITU MOLDING OF A BEARING MATERIAL IN A BALL AND SOCKET JOINT ASSEMBLY

TECHNICAL FIELD

This invention relates generally to a ball and socket joint assembly and more particularly, to a process for in situ injection molding of a plastic bearing having a tapered undercut, in the interfacial space between the ball and socket of a ball and socket joint assembly.

BACKGROUND ART

Ball and socket joint assemblies are commonly used in piston assemblies for use in hydraulic pumps. The joint assemblies used in pumps include a spherical ball and a spherical cavity. The spherical ball is connected to a neck, a stem and a slipper. Upon assembly, this spherical ball is placed in the spherical cavity and mechanically retained therein. During all pivotal movement of the spherical ball in the spherical cavity, the outer surface of the spherical ball is in sliding contact with the surface of the spherical cavity. In order to maintain close tolerances of size, sphericity and surface finish on the spherical ball and cavity surfaces, it is known to inject a bearing material into the interfacial space between the ball and the socket. Usually this bearing material is a plastic material which can be injection molded into the interfacial space. U.S. Pat. No. 5,490,446 issued on Feb. 23, 1996 to William K. Engel, and assigned to Caterpillar Inc., the assignee of the present application, and which is incorporated herein by reference, discloses such an apparatus and method for a piston assembly.

Due to the desired pivotal movement of the stem and the ball through a wide degree of angles, it becomes critical that the plastic bearing located in the interfacial cavity between the ball and socket have some kind of a tapered undercut at its lip so that there is minimum interference between the lip of the bearing and the stem of the ball. If this taper is not present, and the interfacial space is fully filled with the bearing material, the pivotal movement of the stem and ball of the ball/socket joint assembly would be very severely restricted.

In most known injection molding processes for injecting a plastic bearing material into the interfacial space of a ball and socket joint, the molding apparatus includes a stationary mold, a movable mold, and two cross-slides that move perpendicular to and in response to the movement of the movable mold towards and away from the stationary mold during the molding cycle. In the molding cycle, the ball assembly is usually held in the stationary mold. The socket assembly is positioned over the ball, and then the movable mold, which has a recess for securedly holding the socket assembly, is moved towards the stationary mold. As the movable and stationary molds come together, the two cross-slides slide towards the joint assembly and rigidly hold the assembly together. The runners and the gate through which the plastic bearing material is injected into the interfacial space, are located in the cross-slides. Generally, it is easy to inject a bearing material to fully fill the interfacial space between the ball and socket. However, it is very difficult to mold a tapered undercut at the lip of the bearing without damaging the tapered undercut when the molds are separated for removal of the joint assembly.

One method of in-situ molding of a plastic bearing material with an as-molded tapered undercut, is to have a collapsible core as a part of the cross-slide. However, this method leaves witness lines in the molded part, makes the tooling very costly, and requires significant amount of space for the collapsing mechanism to function properly. Lack of space is the prime reason why a collapsing core cannot work for molding this tapered undercut in a ball and socket joint bearing.

Another method to create a tapered undercut in the bearing is to first injection mold the plastic material and completely fill the interfacial space with the plastic and then, to machine a taper on the lip of the bearing. However, this additional step of machining represents a waste of time, labor and resources.

It is desirable to mold a plastic bearing having a tapered undercut for a ball and socket joint by a process which involves the minimum waste of time, natural resources and equipment. It is also desirable to provide a process for molding this tapered undercut such that the production efficiency of the injection molding process is not detrimentally compromised. It is yet further desirable to provide a process to mold a tapered undercut that results in a high quality part with very low percentage of defects and no witness lines.

The present invention is directed to overcoming one or more of the problems as set forth above.

DISCLOSURE OF THE INVENTION

In one aspect of the present invention, an improvement in a process for injection molding a plastic material into an interfacial space between a spherical ball and a spherical cavity of a ball and socket joint assembly to form a plastic bearing, is disclosed. The plastic bearing has an as-molded tapered undercut. The joint assembly includes a ball assembly and a socket assembly. The ball assembly includes the spherical ball and a neck. The socket assembly includes the spherical cavity. The process utilizes a stationary mold adapted for receiving one of the ball assembly and the socket assembly, and a movable mold adapted for receiving one of the ball assembly and the socket assembly. The movable mold is movable towards and away from the stationary mold. The process also utilizes first and second cross-slides. The cross-slides are in sliding contact with the stationary and movable molds. The cross-slides are adapted for slidably moving in response to and in a direction perpendicular to the movement of the movable mold. The cross-slides are contactable with the ball and socket joint assembly when the spherical ball is positioned within the spherical cavity. The improvement comprises the following steps: A sacrificial ring having a preselected outer diameter and a generally triangular cross-sectional shape is selected. The sacrificial ring is separable into two or more semi-circular portions. The ring has first, second and third sides. The ring is formed from materials dissimilar from the plastic bearing material. The ball is positioned within the spherical cavity to form an interfacial space therein. The sacrificial ring is placed around the ball adjacent the neck. The first side of the ring is in contact with the external surface of the ball. The second side is in sliding contact with the cross-slides when the cross-slides are urged towards the ball and socket assembly. The third side forms a tapered end for confining the interfacial space. The movable mold is urged towards the stationary mold and the cross-slides are urged towards each other and towards the ball and socket joint assembly. The sacrificial ring is rigidly confined between the ball, the cavity, and the cross-slides. The plastic material is injection molded into the interfacial space and a plastic bearing having a tapered undercut which mimics the shape of the third side of the sacrificial ring is formed.

In another aspect of the present invention, a method of assembling a ball and socket joint assembly is disclosed. The joint assembly has a ball assembly having a neck portion and a convex spherical surface ball portion extending from the neck portion. The joint assembly also has a socket assembly having a concave spherical surface cavity. The ball portion is positioned in the spherical cavity and is spaced away from the cavity to form an interfacial space of predetermined dimensions. The interfacial space includes a plastic bearing. The bearing has an as-molded tapered undercut to allow axial movement of the ball and the neck in the spherical cavity. The method of assembly comprises the following steps: The ball portion is precisely positioned within the concave spherical cavity to define the interfacial space therebetween. A sacrificial ring having a generally triangular cross-sectional shape is selected. The sacrificial ring is separable into two or more semi-circular portions. The ring has first, second and third sides, and the ring is formed from materials dissimilar from the plastic bearing. The sacrificial ring is placed around the ball adjacent the neck. The ring is in contact with the external surface of the ball and forms a tapered closed end for the interfacial space. The plastic material is injection molded into the interfacial space to form a plastic bearing having a tapered undercut which mimics the shape of the sacrificial ring to allow axial movement of the ball portion and to secure the ball portion within the cavity.

BRIEF DESCRIPTION OF THE DRAWINGS

FIG. 1a is an enlarged portion of FIG. 1, showing the spherical ball positioned in a spherical cavity, with a sacrificial ring provided for forming a tapered undercut in the bearing during molding, wherein one side of the sacrificial ring has a flat surface according to one embodiment of the present invention;

FIG. 1b is an enlarged portion of FIG. 1, wherein one side of the sacrificial ring has a concave surface according to another embodiment of the present invention;

FIG. 2 is a diagrammatic representation of the molding apparatus of FIG. 1 in closed position; and FIG. 3 is a diagrammatic representation of the molding apparatus of FIG. 1 in closed position, and showing the runner and gates for the delivery of the plastic material into the interfacial space.

BEST MODE FOR CARRYING OUT THE INVENTION

Figure 1:
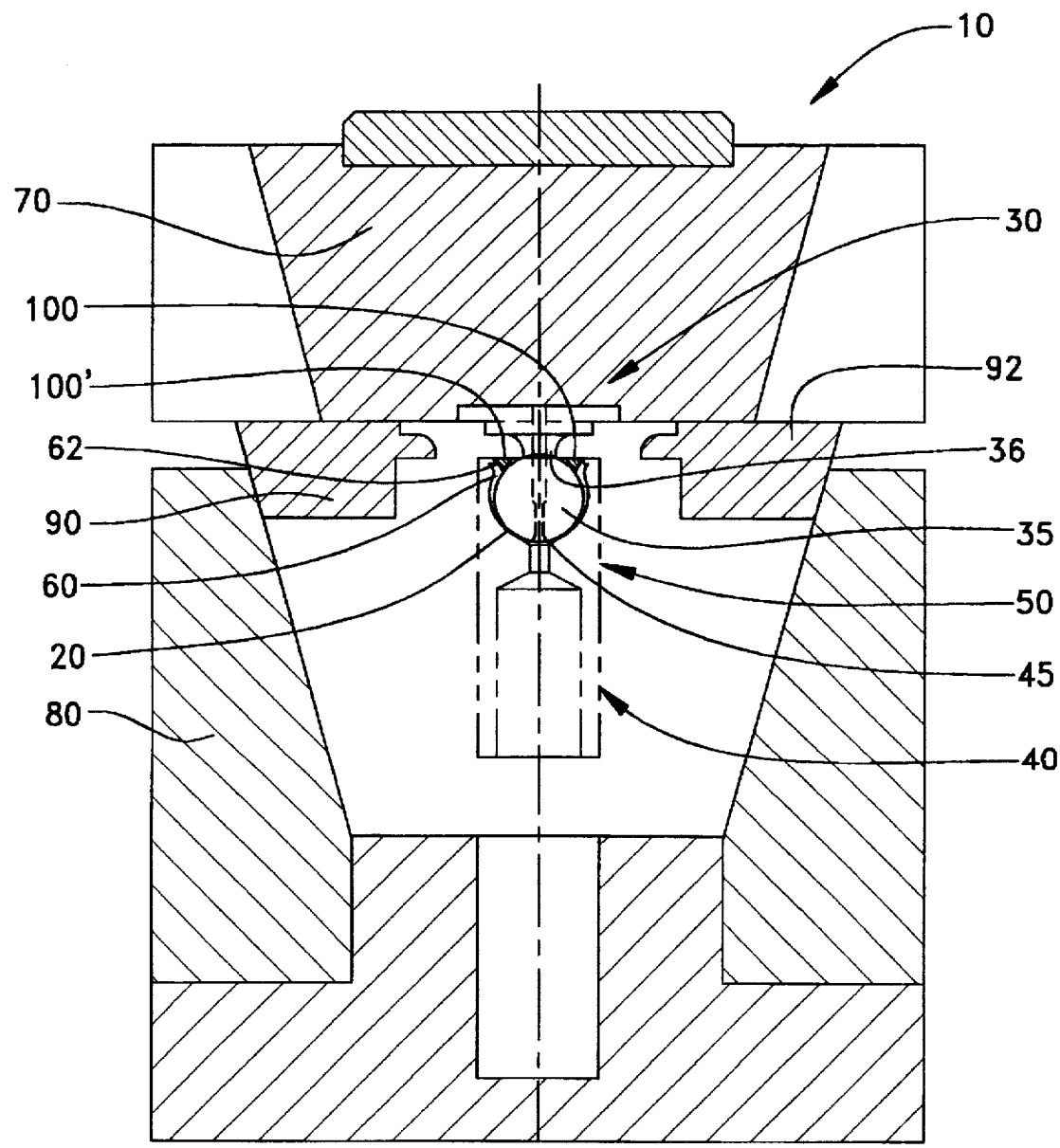
FIG. 1 is a diagrammatic representation of a molding apparatus in open position, for in-situ molding of a bearing in the interfacial space of ball and socket joint assembly and illustrating an embodiment of the process of the present invention.

Referring to FIG. 1, a molding apparatus 10 for injection molding a plastic material into an interfacial space 20 between a spherical ball 35 and a spherical cavity 45 of a ball and socket joint assembly 50 to form a plastic bearing 60, is disclosed. The plastic bearing 60 has an as-molded tapered undercut 62. The joint assembly 50 includes a ball assembly 30 and a socket assembly 40. The ball assembly 30 includes the spherical ball 35 and a neck 36. The socket assembly 40 includes the spherical cavity 45.

In the preferred embodiment of the process of this invention, a stationary mold 70 adapted for receiving the ball assembly 30 and a movable mold 80 adapted for receiving the socket assembly 40 is utilized. The movable mold 80 is movable towards and away from the stationary mold 70. The process also utilizes first and second cross-slides 90,92. The cross-slides 90,92 are in sliding contact with the stationary mold 70 and the movable mold 80. The cross-slides 90,92 are adapted for slidably moving in response to and in a direction perpendicular to the movement of the movable mold 80. The cross-slides 90,92 are contactable with the ball and socket joint assembly 50 when the spherical ball 35 is positioned within the spherical cavity 45.

As shown more clearly in FIG. 1a, in the preferred embodiment of the present invention, the improvement comprises the following steps: A sacrificial ring 100 having a preselected outer diameter and a generally triangular cross-sectional shape is selected. The sacrificial ring 100 is separable into two or more semi-circular portions 100',100". The ring has a first side 101, a second side 102 and a third side 103. The ring is formed from materials dissimilar from the plastic bearing material. The ball 35 is positioned within the spherical cavity 45 to form an interfacial space 20 therein. The sacrificial ring 100 is placed around the ball 35 adjacent the neck 36 of the ball assembly 30. The first side 101 of the ring 100 is in contact with the external surface 37 of the ball 35.

Referring to FIG. 2, the second side 102 is in sliding contact with the cross-slides 90,92 when the cross-slides are urged towards the ball and socket assembly 50. The third side 103 forms a tapered end for confining the interfacial space 20. To close the molding apparatus 10 for starting the molding cycle, the movable mold 80 is urged towards the stationary mold 70 and the cross-slides 90,92 are urged towards each other and towards the ball and socket joint assembly 50. The sacrificial ring 100 is rigidly confined between the ball 35, the wall 46 of the spherical cavity 45, and the cross-slides 90,92. The plastic material is injection molded into the interfacial space 20 and a plastic bearing 60 having a tapered undercut 62 which mimics the shape of the third side 103 of the sacrificial ring 100, is formed. The sacrificial ring 100 is then removed after the mold is opened and the ring is then discarded.

In the preferred embodiment of the present invention, the sacrificial ring is desirably formed from one of metallic or non-metallic materials, and preferably, from non-metallic materials, such as thermoplastic or thermoset plastics, for example. The term "sacrificial ring" as used herein, means a disposable ring that can be removed from the mold and discarded after each molding cycle. Various types of plastics may be used for forming the sacrificial ring and such plastic materials are well known to those skilled in the art. It is preferred that the plastic material used for forming the sacrificial ring be different from the plastic material used for forming the bearing, so that after molding, the ring is easily separated from the in situ molded bearing and discarded. It is also preferred that the plastic material used for forming the ring be able to withstand the molding temperature encountered during the injection molding of the bearing plastic material, otherwise the ring would melt or otherwise destruct during the injection molding step.

In the preferred embodiment of the present invention, the angle formed by the second and third sides of the ring is desirably in the range of about 30 degrees to about 60 degrees, and preferably about 45 degrees. An angle less than 30 degrees is undesirable because the resultant tapered undercut of the bearing would be too small and the pivotal movement of the ball and neck would be detrimentally reduced. An angle greater than 60 degrees is also undesirable because the resultant tapered undercut of the bearing would be too large and the retention of the ball in the socket would be detrimentally compromised.

In the preferred embodiment of the present invention, the first side 101 of the ring desirably has a flat surface, as shown in FIG. 1a. Preferably, the first side of the ring has a concave surface which mimics the corresponding convex surface of the spherical ball, as shown in FIG. 1b. A concave surface is preferred because it is matable with the corresponding convex surface of the ball and thus provides a tight seal, thus minimizing the likelihood of leakage of the plastic bearing material during the injection molding step.

In the preferred embodiment of the present invention, the outer diameter of the ring is preferably about equal to the inner diameter of the spherical cavity. This facilitates a tight fit of the sacrificial ring within the wall of the spherical cavity and minimizes the likelihood of leakage of the plastic bearing material during the injection molding step.

In the preferred embodiment of the present invention, the plastic bearing is free of any witness lines.

Other aspects, objects and advantages of this invention can be obtained from a study of the drawings, the disclosure and the appended claims.

Industrial Applicability

Referring once again to FIG. 1, which shows an injection molding apparatus 10 in the open position, the movable mold 80 is spaced away from the stationary mold 70. Due to the angular profile of the molds, the cross-slides 90,92 are pulled apart and spaced away from the ball and socket joint assembly 50. In this open position, the sacrificial ring 100 is positioned around the ball 35 adjacent the neck 36.

Referring to FIG. 2, which shows the molding apparatus 10 in the closed position, the mold 80 is moved towards mold 70, thereby causing the cross slides 90,92 to come towards each other and to contact the ball and socket joint assembly 50. The sacrificial ring 100, which is in sliding contact with the cross-slides, is pushed towards the ball surface 37 and also pushed against the wall 47 of the spherical cavity 45. The surface 102 of the sacrificial ring 100 is in sliding contact with the cross slides 90,92. When the sacrificial ring is locked into place and the molds are closed, the interfacial space 20 becomes a closed and confined space. In this position, the bearing material is ready to be injected into the space 20.

Referring now to FIG. 3 which shows the schematic layout of the runners 110,110' and the gates 112,112', the plastic material is injected into the space 20 via gates 112,112' and a bearing is formed in the space 20. The bearing 60 has a tapered undercut 62 which facilitates the pivotal motion of the ball and neck.

When the injection molding step is completed, the molds 70 and 80 are parted, causing the cross slides 90,92 to be pulled away from the joint assembly 50. Then the ring 100 can be taken out and discarded and the injection molding process can be repeated.

We claim:

1. In a process for injection molding a plastic material into an interfacial space between a spherical ball and a spherical cavity of a ball and socket joint assembly to form a plastic bearing, said plastic bearing having an as-molded tapered undercut, said joint assembly including a ball assembly and a socket assembly, said ball assembly including said spherical ball and a neck, said spherical ball having an external surface, and said socket assembly including said spherical cavity, and said process utilizing a molding apparatus including a stationary mold adapted for receiving one of said ball assembly and said socket assembly, a movable mold adapted for receiving one of said ball assembly and said socket assembly and movable towards and away from said stationary mold, and first and second cross-slides, said cross-slides being in sliding contact with said stationary and movable molds, said cross-slides being adapted for slidably moving in response to and in a direction perpendicular to the movement of said movable mold, and said cross-slides being contactable with said ball and socket joint assembly when said spherical ball is positioned within said spherical cavity, an improvement, comprising the steps of:

selecting a sacrificial ring having a preselected outer diameter, a generally triangular cross-sectional shape, said sacrificial ring being separable into two or more semi-circular portions, said ring having first, second and third sides, and said ring being formed from a material dissimilar from said plastic bearing material;

positioning said ball within said spherical cavity and forming an interfacial space therebetween;

placing said sacrificial ring around said ball, said first side of said ring being in contact with the external surface of said ball, said second side of said ring being in sliding contact with said cross-slides when said cross-slides are urged towards said ball and socket assembly, and said third side of said ring forming a tapered end for confining said interfacial space;

closing said molding apparatus by urging said movable mold towards said stationary mold, and urging said cross-slides towards each other and towards said ball and socket joint assembly;

rigidly confining said sacrificial ring between said ball, said cavity, and said cross-slides;

injection molding said plastic material into said interfacial space and forming a plastic bearing having a tapered undercut which mimics the shape of said third side of said sacrificial ring, and;

opening said molding apparatus and removing said sacrificial ring, thereby providing said ball and socket joint assembly having said plastic bearing with said tapered undercut.

2. A process, as set forth in claim 1, wherein said sacrificial ring is formed from a metallic material.

3. A process, as set forth in claim 1, wherein the angle formed by said second and third sides of said ring is in the range of about 30 degrees to about 60 degrees.

4. A process, as set forth in claim 1, wherein said first side of said ring has a flat surface.

5. A process, as set forth in claim 1, wherein said first side of said ring has a concave surface, said concave surface being matable with the corresponding convex surface of the ball of said ball assembly.

6. A process, as set forth in claim 1, wherein the outer diameter of said ring is about equal to the diameter of said spherical cavity.

7. A process, as set forth in claim 1, wherein said plastic bearing is free of any witness lines.

8. A process, as set forth in claim 1, wherein said sacrificial ring is formed from a non-metallic material.

9. A method of assembling a ball and socket joint assembly, said joint assembly having a ball assembly having a neck portion and a convex spherical surface ball portion extending from said neck portion, and having a socket assembly having a concave spherical surface cavity, said ball portion being positioned in said spherical cavity and being spaced away from said cavity to form an interfacial space of predetermined dimensions, and said interfacial space including a plastic bearing, said bearing having an as-molded tapered undercut to allow axial movement of said ball and said neck in said spherical cavity, said method of assembly comprising the steps of:

precisely positioning the ball portion within the concave spherical cavity to define said interfacial space therebetween;

selecting a sacrificial ring having a generally triangular cross-sectional shape, said sacrificial ring being separable into two or more semi-circular portions, said ring having first, second and third sides, and said ring being formed from a material dissimilar from said plastic bearing;

placing said sacrificial ring around said ball, said ring being in contact with the convex spherical surface of said ball and forming a tapered closed end for said interfacial space; and injection molding said plastic material into said interfacial space and forming a plastic bearing having a tapered undercut which mimics the shape of said sacrificial ring to allow axial movement of said ball portion and to secure the ball portion within said cavity, and;

removing said sacrificial ring, thereby providing said ball and socket joint assembly having said plastic bearing with said as-molded tapered undercut.

10. The method, as set forth in claim 9, including using an injection molding apparatus having a stationary mold adapted for receiving one of said ball assembly and said socket assembly, a movable mold adapted for receiving one of said ball assembly and said socket assembly and movable towards and away from said stationary mold, and first and second cross-slides, said cross-slides being in sliding contact with said stationary and movable molds and said ring, said cross-slides being adapted for slidably moving in response to and in a direction perpendicular to the movement of said movable mold, and said cross-slides being contactable with said ball and socket joint assembly when said spherical ball is positioned within said spherical cavity.

11. A method, as set forth in claim 10, wherein the step of placing the sacrificial ring includes urging said ring towards said ball and spherical cavity when said cross-slides are urged towards said ball and socket joint assembly.

* * * * *